United States Patent [19]

Bevilacqua, Jr. et al.

[11] Patent Number: 5,925,196

[45] Date of Patent: Jul. 20, 1999

[54] THIXOTROPIC LOW-SOLVENT, NON-HAP WHEEL WELL CLEANER

[75] Inventors: Philip Bevilacqua, Jr., Lusby, Md.; Kenneth G. Clark, Chalfont, Pa.; David L. Gauntt, St. Leonard, Md.

[73] Assignee: The United States of America as represented by the Secretary of the Navy, Washington, D.C.

[21] Appl. No.: 09/183,966

[22] Filed: Nov. 2, 1998

Related U.S. Application Data

[62] Division of application No. 08/932,794, Sep. 4, 1997.

[51] Int. Cl.$^6$ .............................. C11D 1/72; C11D 3/26; B08B 3/04
[52] U.S. Cl. ........................... 134/42; 510/245; 510/254; 510/264; 510/265; 510/421; 510/423; 510/500
[58] Field of Search .................... 510/245, 254, 510/255, 264, 265, 421, 423, 500; 134/42

[56] References Cited

U.S. PATENT DOCUMENTS

| | | | |
|---|---|---|---|
| 3,827,983 | 8/1974 | Mitchell et al. | 252/89 |
| 4,511,488 | 4/1985 | Matta | 252/162 |
| 5,013,485 | 5/1991 | Tsukuda et al. | 252/551 |
| 5,080,822 | 1/1992 | VanEenam | 252/170 |
| 5,196,136 | 3/1993 | Dishart et al. | 252/170 |
| 5,213,624 | 5/1993 | Williams | 134/40 |
| 5,271,773 | 12/1993 | Hamilton et al. | 134/10 |
| 5,324,443 | 6/1994 | Arif et al. | 252/142 |
| 5,376,297 | 12/1994 | Choy et al. | 252/108 |
| 5,393,454 | 2/1995 | Mondin et al. | 252/174.23 |
| 5,489,394 | 2/1996 | Ford et al. | 252/162 |
| 5,542,983 | 8/1996 | Hamilton et al. | 134/10 |
| 5,736,495 | 4/1998 | Bolkan et al. | 510/202 |
| 5,780,415 | 7/1998 | Leonard et al. | 510/417 |

*Primary Examiner*—Yogendra N. Gupta
*Assistant Examiner*—Gregory R. Delcotto
*Attorney, Agent, or Firm*—Ron Billi

[57] ABSTRACT

The present invention relates to a cleaning composition for cleaning aircraft wheel wells. The cleaning composition broadly comprises from about 0.1 to about 15% of a D-limonene composition, containing less than 0.5% of a stabilizing anti-oxidant, acting as a solvent for said greasy soils, from about 0.1% to about 5.0% of a material for increasing the flash point of said cleaning composition above 140° F., such as an isoparraffinic hydrocarbon solvent, from about 10% to about 50% of a mixture of linear alcohol ethoxylates having a HLB in the range of 2 to 15 as a stabilizer, and the balance water. The cleaning composition may also contain from 0.1% to about 10% capryolamphopropionate, from about 0.1% to about 15% dipropylene glycol, from about 0.1% to about 5.0% benzotriazole, and 0.1% to about 5.0% sodium bicarbonate.

1 Claim, No Drawings

THIXOTROPIC LOW-SOLVENT, NON-HAP WHEEL WELL CLEANER

This application is a division of application Ser. No. 08/932,794, filed Sep. 4, 1997 pending.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention relates to a thixotropic, low solvent, non-hazardous, biodegradable cleaning composition intended for use in the cleaning of aircraft wheel wells and to a method for applying the cleaning composition.

(2) Description of the Prior Art

It has long been a problem in the formulation of cleaning compositions to have a cleaning composition which is environmentally sound as well as effective from a cleaning standpoint. D-limonene, a by-product of the citrus industry, has been found to be an effective cleaning and degreasing solvent. However, D-limonene by itself has other problems. Thus, efforts have been made to develop cleaning compositions based upon D-limonene which meet safety and environmental concerns. U.S. Pat. No. 4,511,488 to Matta illustrates one such cleaning composition based upon D-limonene. The Matta cleaning composition contains D-limonene, a surface active agent selected from the group consisting of anionic, nonionic and mixed anionic-nonionic surfactants, and a coupling agent, suitably a glycol or a lower alkyl glycol ether.

Another cleaning composition containing D-limonene is illustrated in U.S. Pat. No. 5,213,624 to Williams. The Williams cleaning composition contains a terpene solvent such as D-limonene, an aliphatic glycol monoether co-solvent such as dipropylene glycol monomethyl ether, a mixture of nonionic surfactants selected from (1) a capped alkylphenol ethoxylate or an ethoxylated higher aliphatic alcohol, and (2) a fatty acid alkanolamide, and water. Neither the Matta composition nor the Williams composition is intended to act as a cleaning composition for cleaning aircraft wheel wells.

U.S. Pat. No. 5,324,443 to Arif illustrates a biodegradable aqueous filter cleaner formulation containing carboxylic acid and/or a salt thereof, a nonionic biodegradable surfactant based on oxyalkylated linear alcohols, and a water soluble organic solvent.

Existing cleaners for cleaning aircraft wheel wells are formulated with an aromatic solvent content of up to 10% and a total solvent content of 20 to 32%. The presence of these constituents gives rise to environmental concerns. Of primary concern is the aromatic solvent content in these products. These solvents are cited in the 1990 Clean Air Act as hazardous air pollutants (HAPs), and are targeted for elimination from aircraft maintenance operations in 1997 under the National Emission Standards for Hazardous Air Pollutants. Aromatics also have low permissible exposure limits (PELs) and contribute to workplace health hazards. Finally, aromatic solvents have an extremely low level of biodegradability. This causes concern from a waste treatment standpoint or if the product were to migrate into natural waterways.

Ethylene class glycol ether coupling solvents, included in existing products to improve solubility and stability of the components, are also HAPs and have PELs on the order of 100 parts per million (ppm).

Other solvents may be present in these products, subject to variation by manufacturer, to bring the total solvent content to a maximum of 32%. Most solvents used for this purpose are classified as volatile organics compounds (VOCS) and are subject to local air emission regulations. For example, it is now necessary at the North Island Naval Aviation Depot in California to use aircraft maintenance products containing less than 10% total VOCs in the use dilution. This allows the products to be exempt from Rule 66 of the San Diego County air pollution control regulations.

SUMMARY OF THE INVENTION

Accordingly, it is an object of the present invention to provide a cleaning composition which is effective to clean aircraft wheel wells.

It is still a further object of the present invention to provide a cleaning composition as above which is compatible with environmental regulations.

It is a further object of the present invention to provide a cleaning composition as above which contains no aromatic or ethylene class glycol ether solvents or any other HAPs.

It is yet a further object of the present invention to provide a cleaning composition as above which contains less than 10% vocs.

It is still a further object of the present invention to provide a cleaning composition as above which has a cleaning performance similar to existing cleaning compounds.

The foregoing objects are attained by cleaning compositions in accordance with the present invention.

In accordance with the present invention, a cleaning composition suitable for cleaning aircraft wheel wells comprises from about 0.1 to about 15% of a D-limonene composition, containing less than 0.5% of a stabilizing anti-oxidant, acting as a solvent for said greasy soils, from about 0.1% to about 5.0% of a material for increasing the flash point of said cleaning composition above 140° F., such as an isoparrafinic hydrocarbon solvent, from about 10% to about 50% of a mixture of linear alcohol ethoxylates having a hydrophilic-lipophilic balance (HLB) in the range of 2 to 15 as a stabilizer, and the balance water. The cleaning composition may also contain from 0.1% to about 10% capryolamphopropionate, from about 0.1% to about 15% dipropylene glycol, from about 0.1% to about 5.0% benzotriazole, and 0.1% to about 5.0% sodium bicarbonate.

Other details of the cleaning compositions of the present invention, as well as other objects and advantages attendant thereto, are set forth in the following detailed description.

DETAILED DESCRIPTION OF THE PREFERRED EMBODIMENT(S)

As previously discussed, it is a primary goal of the present invention to provide a thixotropic, low solvent, non-HAP cleaning composition suitable for use as a cleaner for aircraft wheel wells. In developing the cleaning compositions of the present invention, certain issues needed to be addressed.

Due to the need to eliminate aromatic compounds and a reduction in total solvent content, a major obstacle to be overcome was cleaning ability. D-limonene was selected as a base ingredient because of its effectiveness as a solvent on greasy soils and because it has solubility characteristics similar to aromatic compounds. Although still considered a VOC, D-limonene is a naturally occurring, biodegradable solvent produced as a by-product of the citrus industry. One problem occasionally encountered with the use of D-limonene is oxidation when in storage. Thus, a stabilizing anti-oxidant must be present in the cleaning composition in an amount sufficient to retard storage oxidation of the D-limonene and to extend the shelf life of the product. The total D-limonene and anti-oxidant should be present in the cleaning composition in an amount from about 0.1% to about 15% and preferably in an amount from about 5.5% to about 8.0% with the anti-oxidant portion of the combination being 0.5% or less. As used herein, unless otherwise noted, all percentages are percentages by weight. It has been found that a D-limonene product sold by Glidco Organics under the tradename PREPSOLVE may be used in the cleaning compositions of the present invention because it includes a stabilizing anti-oxidant.

Product flammability was another issue which needed to be addressed. Maintenance chemicals are required to have a flash point of greater than 140° F. to be approved for use aboard Navy ships. A material having a flash point greater than 140° F. is also desirable because it is classified as "combustible" rather than "flammable" and would not require storage in a flammable storage cabinet according to Occupational Safety and Heath regulations. D-limonene has a flash point of 119° F. and left alone would cause the cleaning composition to have a similarly low flash point. Thus, another volatile material was required that would mix with the flammable vapor of the D-limonene and thereby increase the flashpoint. It was found that isoparrafinic hydrocarbon solvents, such as a product sold by Exxon Chemical under the tradename ISOPAR M, could be used to raise the flash point above 140° F. if present in an amount from about 0.1% to about 5.0% and preferably in an amount from about 2.0% to about 4.0%.

Flow properties of the cleaning composition were also a primary concern. This cleaning composition is required to be a thixotropic or a gel-type cleaning composition due to the application procedure. The gel is sprayed or brushed onto aircraft wheel wells and allowed to dwell on the surface for several minutes. Once the soil has been solubilized and emulsified, the cleaner is rinsed away with water. Stability of the gel was a problem since D-limonene is difficult to emulsify in this fashion. Thus a combination of linear ethoxylate surfactants of various hydrophilic-lipophilic balance (HLBs) along with dipropylene glycol was added to achieve a gel with the desired consistency or rheological properties. The surfactants also serve the purpose of emulsifying soils that have been solubilized by the solvent, allowing the soil to then be rinsed away with water. Suitable linear alcohol ethoxylates for the cleaning compounds of the present invention are those having a HLB in the range of about 2.0 to about 15.0. The mixture of linear alcohol ethoxylates require a range of molecular weights to provide the desired level of stability. The mixture of linear alcohol ethoxylates are present in the cleaning compositions of the present invention in an amount from about 10.0% to about 50%, preferably in an amount from about 25% to about 35%. A suitable mixture of linear alcohol ethoxylates may comprise: optionally, from about 0.1% to about 10%, preferably from about 4.0% to about 6.0%, of a linear alcohol ethoxylate having a HLB of about 2.0 to 5.0, preferably about 3.0 to 5.0; optionally, from about 0.1% to about 10%, preferably from about 4.5% to about 7.0%, of a linear alcohol ethoxylate having a HLB of about 6.5 to 10.5, preferably about 8.0 to 9.0; from about 5% to about 15%, preferably from about 9.5% to about 12% of a linear alcohol ethoxylate having a HLB of about 11 to 13, preferably about 12 to 13; and from about 5% to about 15%, preferably from about 9.5% to about 12%, of a linear alcohol ethoxylate having a HLB of about 13.1 to 15, preferably about 13.1 to 14. Dipropylene glycol is present in an amount from about 0.1% to about 15%, preferably from about 8.0% to about 10%.

It was found that the surfactants alone were not sufficient, however to obtain the desired product stability. Sodium bicarbonate was added to further stabilize the cleaning composition in gel-form and allow it to remain homogeneous after storage at room temperature, freezing temperatures, and through high temperature cycles intended to simulate extended storage. Sodium bicarbonate is present in an amount from about 0.1% to about 5.0%, preferably from about 0.5% to about 1.5%.

Benzotriazole may be added to the cleaning composition to prevent corrosion problems, particularly on aluminum materials to which the cleaning compound would be applied. Benzotriazole may be present in an amount from about 0.1% to about 5.0%, preferably in an amount from about 0.3% to about 0.7%.

Capryloamphopropionate may be added to the cleaning composition to inhibit the corrosion of steel exposed to the liquid phase, vapor phase, and the vapor-liquid interface of the product, such as would be encountered in a partially filled steel drum. The capryloamphopropionate may be present in an amount from about 0.1% to about 10%, preferably from about 4.0% to about 6.0%.

The balance of the cleaning composition is water which may be present in an amount from about 20% to about 60%.

A formulation which has been found to be suitable for use as a cleaning composition for removing soil from aircraft wheel wells is as follows: 5.0% linear alcohol ethoxylate having a HLB of 3.7, 5.7% linear alcohol ethoxylate having a HLB of 8.5, 10.6% linear alcohol ethoxylate having a HLB of 12.5, 10.7% linear alcohol ethoxylate having a HLB of 13.9, 4.9% capryloamphopropionate, 6.7% PREPSOLVE, 2.9% ISOPAR M, 9.0% dipropylene glycol, 0.5% benzotriazole, 1.0% sodium bicarbonate, and the balance water.

The directions for using the cleaning compositions of the present invention are as follows. Apply the cleaning composition full strength with a pump sprayer or brush. Allow the product to dwell for 5 minutes. Scrub if necessary. Rinse thoroughly with water.

The cleaning compositions of the present invention obtain a level of cleaning performance similar to that of MIL-C-85570, Type V, but contain no aromatic solvents or other HAPs. Further, the cleaning compositions of the present invention contain no ethylene class glycol ether solvents, which are classified as HAPs. The cleaning compositions of the present invention also contain less than 10% total VOCs compared to current formulations containing up to 32% total solvent.

It is apparent that there has been provided in accordance with the present invention a thixotropic, low-solvent, non-HAP wheel well cleaner which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for cleaning aircraft wheel wells comprising the steps of:

applying a cleaning composition comprising from about 0.1% to about 15.0% of a D-limonene composition containing less than about 0.5% of a stabilizing antioxidant, from about 0.1% to about 5.0% of an isoparrafinic hydrocarbon solvent for increasing the flash point of the cleaning composition, from about 0.1% to about 10% of a linear alcohol ethoxylate having a HLB of about 2.0 to 5.0, from about 0.1% to about 10% of a linear alcohol ethoxylate having a HLB of about 6.5 to 10.5, from about 5.0% to about 15% of a linear alcohol ethoxylate having a HLB of about 11 to 13, from about 5.0% to about 15% of a linear alcohol ethoxylate having a HLB of about 13 to 15, from about 0.1% to about 10% capryloamphopropionate, from about 0.1% to about 15% dipropylene glycol, from about 0.1% to about 5% benzotriazole, from about 0.1% to about 5% sodium bicarbonate, and the balance water;

allowing said cleaning composition to dwell on said aircraft wheel well for a tie sufficient to emulsify said soil; and rinsing said wheel well with water.

* * * * *